(12) United States Patent
Garde La Casa

(10) Patent No.: US 10,494,999 B2
(45) Date of Patent: Dec. 3, 2019

(54) THERMALLY EFFICIENT GAS TURBINE ENGINE FOR AN AIRCRAFT

(71) Applicant: Airbus Operations, S.L., Getafe (Madrid) (ES)

(72) Inventor: Alexandre Garde La Casa, Madrid (ES)

(73) Assignee: Airbus Operations, S.L. (ES)

(*) Notice: Subject to any disclaimer, the term of this patent is extended or adjusted under 35 U.S.C. 154(b) by 462 days.

(21) Appl. No.: 15/378,238

(22) Filed: Dec. 14, 2016

(65) Prior Publication Data

US 2017/0298822 A1 Oct. 19, 2017

(30) Foreign Application Priority Data

Dec. 16, 2015 (EP) ..................................... 15382630

(51) Int. Cl.
*F02C 7/08* (2006.01)
*F02C 7/10* (2006.01)
(Continued)

(52) U.S. Cl.
CPC ................. *F02C 7/08* (2013.01); *B64D 27/10* (2013.01); *B64D 41/00* (2013.01); *F01D 1/12* (2013.01); *F01D 5/02* (2013.01); *F01D 9/041* (2013.01); *F01D 15/10* (2013.01); *F01D 15/12* (2013.01); *F01D 17/105* (2013.01); *F02C 3/04* (2013.01); *F02C 3/145* (2013.01); *F02C 7/10* (2013.01); *F02C 9/18* (2013.01); *B64D 2041/002* (2013.01); *F05D 2220/323* (2013.01);
(Continued)

(58) Field of Classification Search
CPC .... F02C 7/08; F02C 7/10; F02C 7/105; F02C 3/145; F02C 9/18; F02C 6/08; F23R 3/54
See application file for complete search history.

(56) References Cited

U.S. PATENT DOCUMENTS 3,302,397 A * 2/1967 Davidovic ................ F02C 7/08
  415/115
3,896,875 A 7/1975 Bolger
(Continued)

FOREIGN PATENT DOCUMENTS

WO 86/02406 A1 4/1986

OTHER PUBLICATIONS

EP Search Report (EP 15 38 2630) dated Jul. 8, 2016.

*Primary Examiner* — Ehud Gartenberg
*Assistant Examiner* — Stephanie Cheng
(74) *Attorney, Agent, or Firm* — Lerner, David, Littenberg, Krumholz & Mentlik, LLP

(57) ABSTRACT

A gas turbine engine for an aircraft includes a compressor, a combustion chamber, and a turbine having at least one stator, and at least one rotor. Each stator and rotor is formed by a plurality of blades, a fluid channel is formed between two consecutive blades, and each blade has two opposing surfaces. The compressor is in fluid communication with a first group of stator channels, and the combustion chamber is in fluid communication with a second group of stator channels, such that heat exchange can be performed through two opposing surfaces of at least one stator blade. The outer and the inner walls define a duct for the passage of the heated fluid through the rotor blades, and the outer wall is also arranged for directing the compressed air towards the combustion chamber.

9 Claims, 5 Drawing Sheets

(51) Int. Cl.
  *F01D 5/02* (2006.01)
  *F01D 9/04* (2006.01)
  *F01D 15/10* (2006.01)
  *F01D 15/12* (2006.01)
  *F02C 3/04* (2006.01)
  *F02C 9/18* (2006.01)
  *F01D 1/12* (2006.01)
  *F02C 3/14* (2006.01)
  *B64D 27/10* (2006.01)
  *B64D 41/00* (2006.01)
  *F01D 17/10* (2006.01)

(52) U.S. Cl.
  CPC ...... *F05D 2220/50* (2013.01); *F05D 2240/35* (2013.01); *F05D 2240/60* (2013.01); *Y02T 50/671* (2013.01)

(56) References Cited

U.S. PATENT DOCUMENTS

| | | | | |
|---|---|---|---|---|
| 4,900,231 | A | * | 2/1990 | Kennedy ................ B64D 41/00 417/16 |
| 5,782,076 | A | * | 7/1998 | Huber ...................... F02C 7/08 415/115 |
| 9,382,910 | B2 | * | 7/2016 | Jan ......................... F04D 17/10 |
| 9,745,894 | B2 | * | 8/2017 | Nilsson ..................... F02C 3/14 |
| 2005/0279080 | A1 | | 12/2005 | Costen et al. |
| 2006/0086078 | A1 | | 4/2006 | Paul |
| 2013/0067932 | A1 | * | 3/2013 | Tillman ................. F23R 3/002 60/806 |
| 2014/0219048 | A1 | | 8/2014 | Kashihara |

\* cited by examiner

THERMALLY EFFICIENT GAS TURBINE ENGINE FOR AN AIRCRAFT

FIELD OF THE INVENTION

The present invention refers to a design of a gas turbine engine for being used in an aircraft, as a main engine or/and as an auxiliary power unit.

An aspect of the invention may provide a more thermally efficient gas turbine engine, without increasing the weight and cost of conventional gas turbine engines, and without requiring dedicated devices for achieving such efficiency.

Another aspect of the present invention may provide a gas turbine engine capable of minimizing pressure losses, generally caused by dedicated devices traditionally used for improving the thermal efficiency of gas turbine engines.

Another aspect of the present invention may provide a simplified gas turbine engine that allows saving weight, cost and space when installed in the aircraft.

BACKGROUND OF THE INVENTION

Gas turbine engines are well-known for providing propulsion and power production. Conventionally, a gas turbine engine consists of an upstream rotating compressor coupled to a downstream turbine, and a combustion chamber in between.

A conventional gas turbine engine 30 is depicted in FIG. 1. Ambient air is received at the inlet of the compressor 3, where it is compressed and forced at a substantially higher pressure and temperature into the combustion chamber 7. There, the compressed air is mixed with fuel and burned, thus further increasing the temperature and pressure by confining the volume into the combustion chamber 7. The resultant combustion gases are then passed through the hot turbine section 5, where mechanical shaft power may be extracted to drive a shaft 27, which couples the turbine 5 with the compressor 3. The remaining exhaust gas pressure is typically used to provide thrust by exhausted in rearward direction.

FIG. 2 shows a detailed cross-sectional view of an upper-half section of the gas turbine engine 30 shown in FIG. 1. Ambient air is taken from compressor inlet 32 where the compressor 3 increases the pressure and temperature until the compressor outlet 36. After this point, compressed air is delivered to the combustion chamber 7 where temperature is increased. Dashed line 33 depicts the hot fluid channel communicating the combustion chamber 7 with the turbine 5, which comprises stators 8, 10 and rotors 9, 11, alternatively positioned along the turbine 5 section. Power is extracted by the turbine 5 from the fluid to the rotatory assembly or to the shaft 27, which mechanically couples the turbine 5 with the compressor 3. Therefore, the power extracted by the turbine 5 is transfer throughout the shaft 27 to the compressor 3, and to other applications required by the aircraft. After the turbine 5, the fluid is delivered downstream by the hot fluid channel 33.

The mentioned cycle may be notably improved by including a dedicated device, traditionally known as heat exchanger or recuperator. Heat exchangers are often used in combination with the combustion stage to recover some of the wasted energy in the exhaust. The wasted heat is transferred to the compressed air, thus preheating it before entering into the combustion chamber. The pre-heated compressed air requires less fuel to heat the mixture of compressed air and fuel up to the turbine inlet temperature. This way, the heat exchanger offers a gas turbine engine more efficient.

FIG. 3 depicts a gas turbine engine 35 with a heat exchanger 23. Ambient air is taken at the inlet of the compressor 3, where it is compressed and forced at a substantially higher pressure and temperature to the heat exchanger 23. In the heat exchanger 23, the compressed air temperature is increased by the fluid delivered by the turbine 5, thus transferring energy between both fluids. Fluid from heat exchanger 23 is conducted to the combustion chamber 7, where fluid temperature is increased. After the combustion chamber 7, fluid is conducted to the turbine 5, at least one turbine stage, where power is transferred from the fluid to the mechanical shaft 27. After the turbine 5, the fluid is delivered to the heat exchanger 23 to be finally delivered to the exterior. The heat exchanger 23 extracts energy from fluid, circulating from the turbine 5 towards the exterior. As in FIGS. 1 and 2, the compressor 3 and the turbine 5 are mechanically coupled by a shaft 27. Power extracted by the turbine 5 is used to provide power to the compressor 3, as well as to provide power to required applications.

However, incorporating a heat exchanger in a gas turbine engine carries some disadvantages, such as an increase in weight, complexity, and cost.

Therefore, it would be desirable to provide technical means for improving the efficiency of a gas turbine engine, without requiring the use of dedicated devices, such as heat exchangers, which involve an increase in weight and cost.

Additionally, it would be desirable to extend these technical means to all aircraft gas turbine engines, such as the main engines and the auxiliary power unit, in such a way that the commonality and reuse of conventional gas turbine engine components are maximized.

BRIEF SUMMARY OF THE INVENTION

Aspect of the present invention overcome the above mentioned drawbacks by providing a gas turbine engine configured to allow heat exchange at the turbine section by the passage of fluid flows at different temperatures, the compressed air and the heated fluid coming from the combustion chamber.

The invention refers to a gas turbine engine for an aircraft comprising a compressor for increasing pressure and temperature of ambient air to obtain compressed air, a combustion chamber for increasing the temperature of the compressed air to obtain a heated fluid, and a turbine comprising an outer wall, an inner wall, at least one stator, and at least one rotor. The outer wall of the turbine having a radial step, and the inner wall overlapping said radial step. Each stator and each rotor is formed by a plurality of blades, wherein each blade has two opposing surfaces. Further, a fluid channel is formed between each two consecutive blades.

According to an embodiment of the invention, stator channels are formed by a first group and a second group of channels. The compressor is in fluid communication with the first group of stator channels, and the combustion chamber is in fluid communication with the second group of stator channels. Thus, heat exchange can be performed through the two opposing surfaces of at least one stator blade.

This way, the stator allows the passage of two different fluid flows at different temperatures without being mixed. The compressed air will be conducted through the first group of channels, since the compressor is in fluid communication with the first group of stator channels, and the heated fluid (the combustion chamber output fluid) will be conducted through the second group of channels, since the combustion chamber is in fluid communication with the second group of stator channels.

Since the compressed air and the heated fluid are at different temperatures, heat exchange can be performed through the two opposing surfaces of at least one stator blade.

Additionally, the outer and the inner walls define a duct for the passage of the heated fluid through the rotor blades before exiting the engine. This way, once the heated fluid has passed through the second group of stator channels, said fluid is conducted to impact onto the rotor blades before being finally exited by the engine. The stator blades that form the second group of stator channels are arranged for directing the heated fluid onto the rotor blades.

Additionally, the outer wall of the turbine is also arranged for directing the compressed air towards the combustion chamber. This way, once the compressed air has passed through the first group of stator channels, the fluid is directed towards the combustion chamber where its temperature is increased. The stator blades that form the first group of stator channels are arranged for directing the compressed fluid towards the combustion chamber by the outer wall of the turbine.

Therefore, an embodiment of the invention provides two different routes for two fluid flows at different temperatures, the compressed air and the heated fluid (the combustion chamber output fluid), wherein both routes cross the stators of the turbine thus allowing heat exchange through at least one stator blade.

Thus, an embodiment of the invention provides a gas turbine engine with the capability of performing heat exchange, since the compressed air can be pre-heated before entering the combustion chamber. This way, the invention provides a more thermally efficient gas turbine engine, without requiring any dedicated device for achieving such improvement.

Additionally, an aspect of the invention achieves a weight reduction by avoiding the presence of any dedicated device, conventionally required for pre-heating the compressed air.

Further, since no dedicated device is needed, an aspect of the invention allows reducing installation, recurrent and direct maintenance costs.

Moreover, providing a gas turbine engine that makes use of the conventional gas turbine engine components, the invention maximizes the commonality and reuse of such conventional components.

BRIEF DESCRIPTION OF THE DRAWINGS

For a better comprehension of the invention, the following drawings are provided for illustrative and non-limiting purposes, wherein.

DETAILED DESCRIPTION

Figure 4:
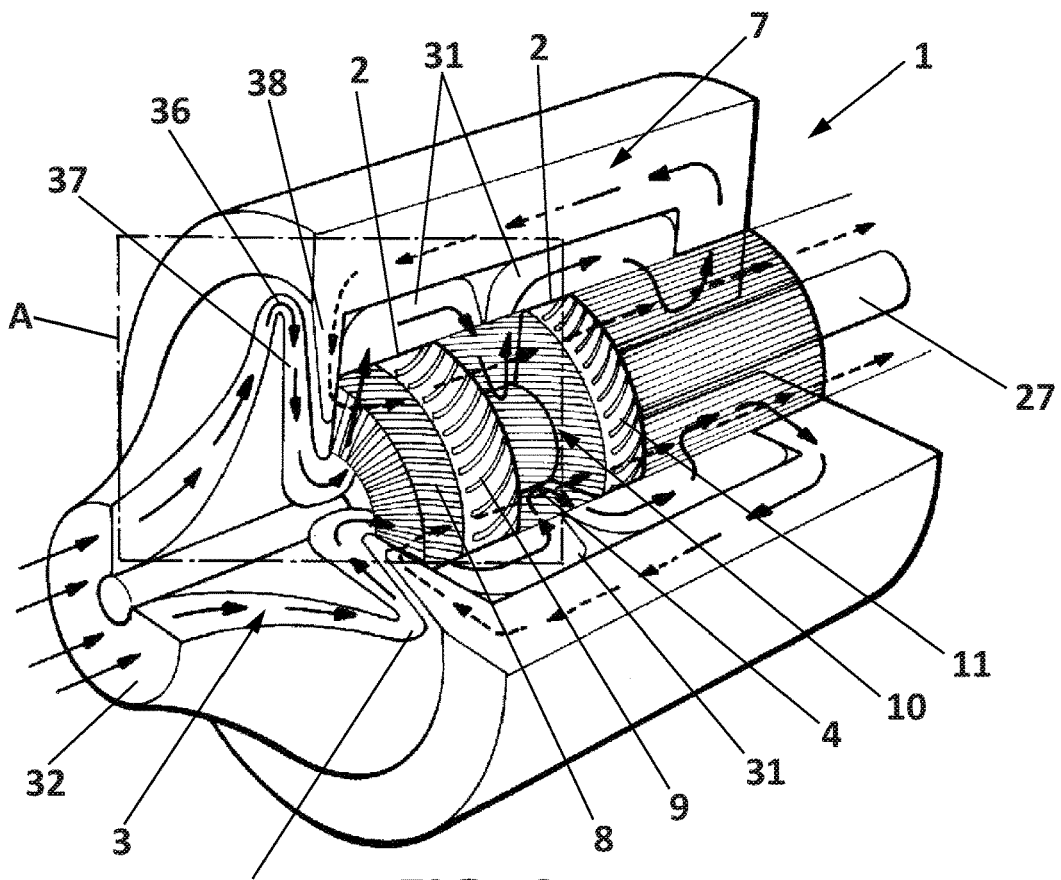
FIG. 4 shows a schematic perspective view of a gas turbine engine for an aircraft, according to a preferred embodiment of the invention.

FIG. 4 shows a schematic perspective view of a gas turbine engine 1 for an aircraft. The engine 1 comprises a compressor 3 for increasing pressure and temperature of ambient air to obtain compressed air, a combustion chamber 7 for further increasing the temperature of the compressed air by burning it with fuel, and a turbine 5 disposed downstream of the combustion chamber 7 and comprising radially outer 2 and inner 4 walls, at least one stator 8, 10, and at least one rotor 9, 11.

The outer wall 2 and the inner wall 4 are circumferentially spaced around the engine. The outer wall 2 of the turbine having a radial step, and the inner wall 4 overlapping said radial step.

Each stator 8, 10 and each rotor 9, 11 is formed by a plurality of blades, wherein each blade has two opposing surfaces. A fluid channel is formed between each two consecutive blades.

According to an embodiment of the invention, the stator channels are formed by a first group 28 and a second group 29 of channels. The compressor 3 is in fluid communication with the first group of stator channels 28, and the combustion chamber 7 is in fluid communication with the second group of stator channels 29. Thus, heat exchange can be performed through the two opposing surfaces of at least one stator blade, since the compressed fluid and the combustion chamber output fluid are at different temperatures.

Also, the gas turbine engine 1 is configured to provide complete different routes along the turbine 5 for the two fluid flows. For that, the outer 2 and the inner 4 walls are arranged for defining a duct for the passage of the heated fluid, where the outer wall 2 is also arranged for directing the compressed air towards the combustion chamber 7. The stator 8, 10 blades forming the second group of stator channels are arranged for directing the heated fluid onto the rotor blades, and the stator 8, 10 blades forming the first group of stator channels are arranged for directing the compressed fluid upwardly to be conducted towards the combustion chamber by the outer surface of the outer wall 2.

Preferentially, the turbine 5 comprises at least two stators. In this case, the gas turbine engine 1 further comprises at least one deflector 31 coaxially arranged and radially outward with respect to the stators 8, 10.

The deflector 31 is configured for directing the compressed air through each one of the first groups of stator channels 28 of the turbine 5 before entering the combustion chamber 7. Also, rotor 9, 11 blades are arranged for directing the heated fluid onto the second group of stator channels 29 of the following stator 10 before exiting the gas turbine engine 1.

This way, the compressed air is conducted to pass through each one of the first groups of stator channels 28 of the turbine 5 by means of the deflectors 31 and the outer surface of the outer wall 2 of the turbine 5, while the heated fluid is conducted to pass through each one of the second groups of stator channels 29 of the turbine 5 and also through the rotors 9, 11 by means of the rotor blades arrangement.

Figure 5:
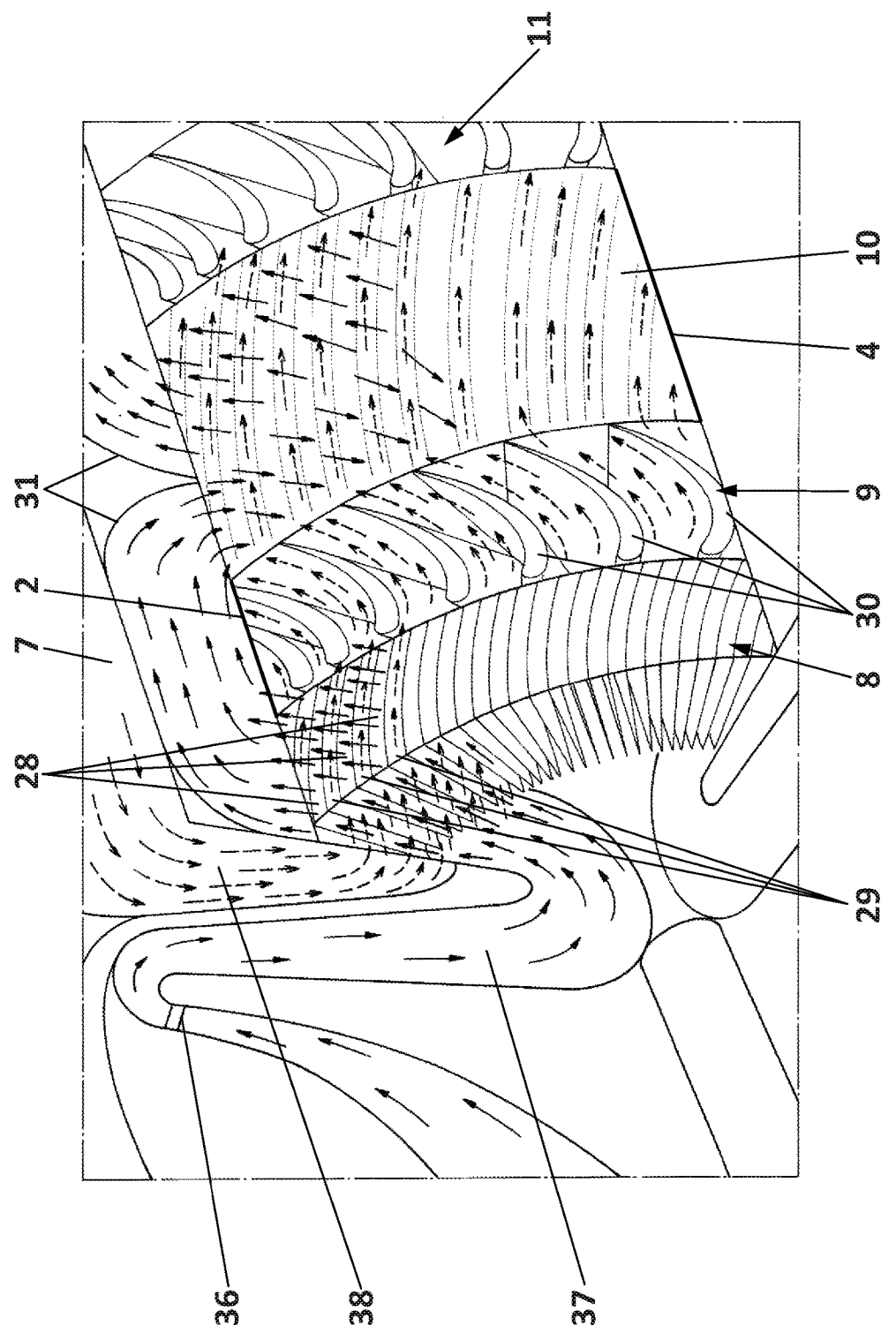
FIG. 5 shows a detailed view of a section of the gas turbine engine shown in FIG. 4, in which the two fluid flows can be distinguished.

As shown in FIGS. 4 and 5, ambient air is taken by the compressor 3 at the compressor inlet 32, from where it is compressed and forced at a substantially higher pressure and temperature to the compressor outlet 36. From that, compressed air is conducted by a compressor outlet duct 37 to the first group of stator channels 28 of the first stator 8. Once the compressed air crossed the first stator 8, it is conducted to the combustion chamber 7 by the outer surface of the outer wall 2 and the deflectors 31.

As shown in FIG. 4, the inner wall 4 is surrounded by the stators 8, 10, while the rotors 9, 11 are surrounded by the outer wall 2.

FIG. 4, and FIG. 5 in more detail, show that deflectors 31 are preferably extended between each pair of consecutive stators 8, 10, such that the compressed air is conducted from the output of a first group of stator channels 28 of one stator 8 to the input of the first group of stator channels 28 of the consecutive stator 10.

As shown in FIG. 4, the compressor outlet duct 37 is arranged for directing the compressed air outwardly through the first group of stator channels of the stator 8. The compressed air is received by a deflector 31, which is arranged for directing the compressed air inwardly, to pass through the first group of stator channels of the following stator. In between, the outer surface of the outer wall 2 avoids compressed air enter the rotor 9 positioned between the two consecutive stators 8, 10, and thus passing through each one of the stators of the turbine.

When passing through the combustion chamber 7, compressed air is mixed with fuel and burned, obtaining a heated fluid. Such heated fluid is conducted to the second group of stator channels 29 of the first stator 8. Then, the outer 2 and the inner wall 4 conduct the heated fluid to pass through the rotor blades. Rotor 9, 11 blades are arranged for directing the heated fluid onto the second group of stator channels 29 of the consecutive stator, and so on until exiting the gas turbine engine.

As shown in FIGS. 4 and 5, the gas turbine engine 1 preferably comprises a compressor outlet duct 37 for conducting the compressed air from the compressor 3 to the first group of stator channels 28 of the stator 8, and a combustion chamber outlet duct 38 for conducting the heated fluid from the combustion chamber 7 to the second group of stator channels 29 of the stator 8, wherein the compressor outlet duct 37 comprises fluid directing means for directing the compressed air towards the first group of stator channels 28, and wherein the combustion chamber outlet duct 38 comprises fluid directing means for directing the heated fluid towards the second group of stator channels 29.

Preferably, the compressor outlet duct 37 and the combustion chamber outlet duct 38 comprise a grid at their outlet ports for respectively directing the output fluid towards the first 28 and the second group of stator channels 29.

Alternatively, the at least one stator 8 further comprises a grid configured to receive compressed air at the first group of stator channels 28 and heated fluid at the second group of stator channels 29.

Figure 1:
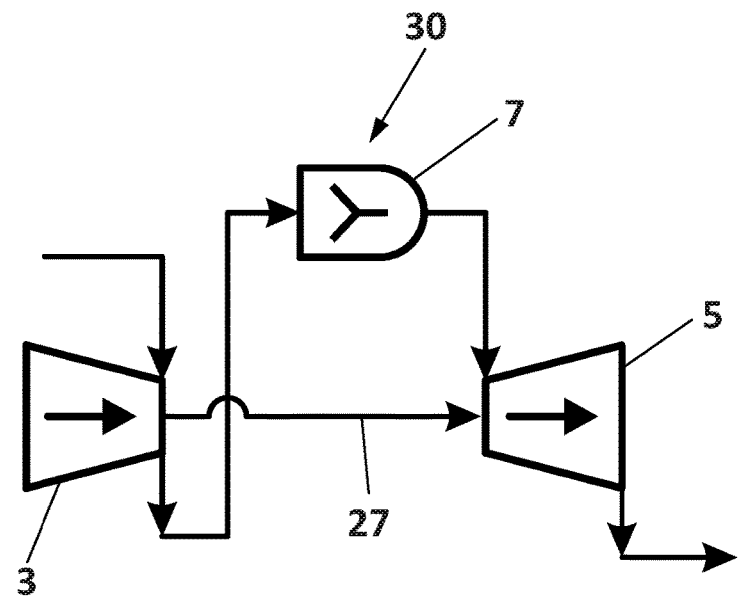
FIG. 1 shows a schematic block diagram of a conventional gas turbine engine of an aircraft.
Figure 6:
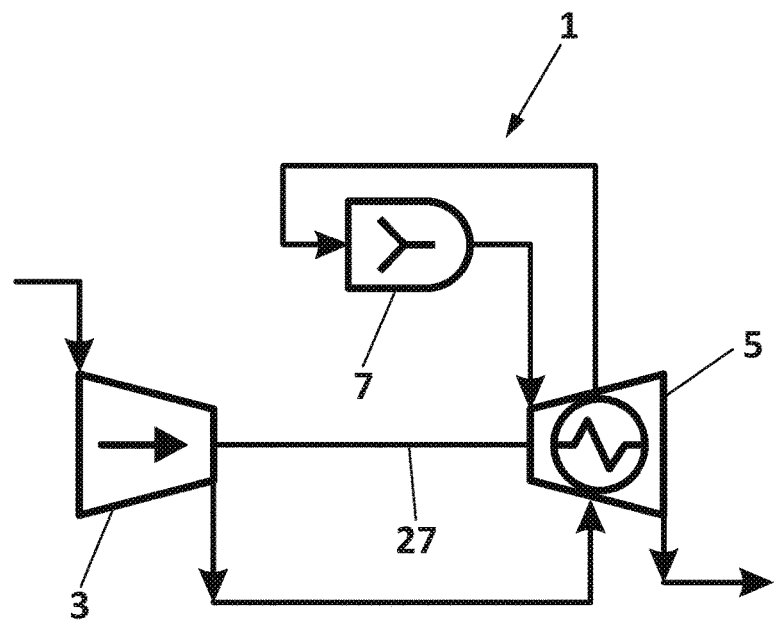
FIG. 6 shows a schematic block diagram of the gas turbine engine shown in FIG. 4.

FIG. 6 shows the gas turbine engine 1 in a schematic block diagram representation. Similarly to the gas turbine engine 30 of FIG. 1, the engine 1 of the invention comprises a compressor 3, a combustion chamber 7, and a turbine 5. According to an embodiment of the invention, the turbine 5 is configured to perform heat exchange, thus being considered as integrating a heat exchanger.

Figure 2:
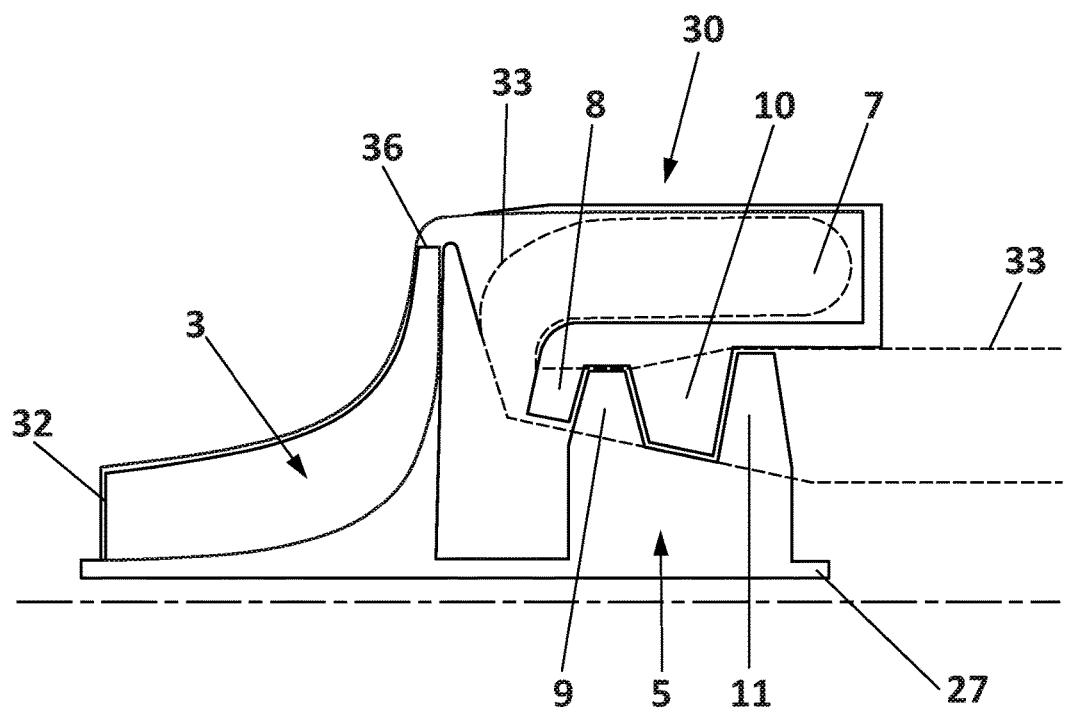
FIG. 2 shows a detailed cross sectional view of an upper-half section of the gas turbine engine of FIG. 1.
Figure 7:
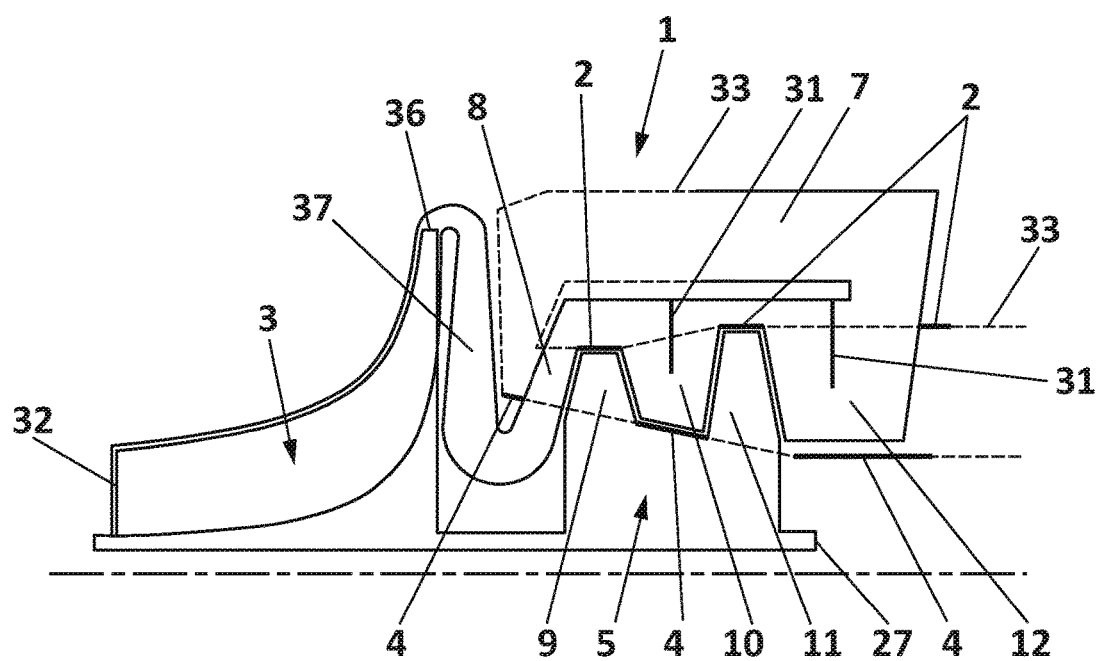
FIG. 7 shows a detailed cross sectional view of an upper-half section of the gas turbine engine of FIG. 6.

FIG. 7 shows a detailed cross sectional view of an upper-half section of the gas turbine engine 1 of FIG. 6. Similarly to FIG. 2, ambient air is taken from compressor inlet 32 where the compressor 3 increases the pressure and temperature until the compressor outlet 36. There, according to an embodiment of the invention, a compressor outlet duct 37 conducts the compressed air into the first group of stator channels of the first stator 8. Then, compressed air is conducted by the outer wall 2 and the deflectors 31 until the combustion chamber 7. After the combustion chamber 7, heated fluid is delivered downstream by the hot fluid channel 33 passing, between the inner 4 and the outer wall 2, through the second group of stator channels of the stators 8, 10, and through the alternating rotors 9, 11 before exiting the gas turbine engine.

Figure 8:
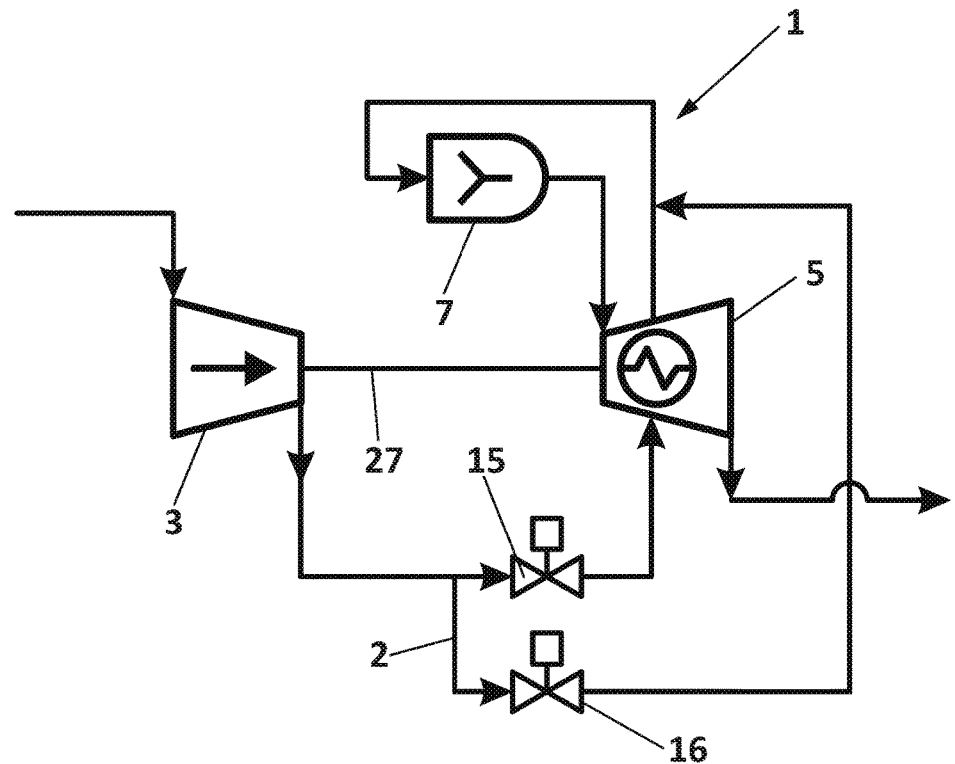
FIG. 8 shows a schematic block diagram of a gas turbine engine, in which valves are included for controlling the flow of fluid through the turbine, according to another preferred embodiment of the invention.

According to a preferred embodiment, and as shown in FIG. 8, the gas turbine engine 1 further comprises a turbine passing valve 15 and a turbine by-passing valve 16, the turbine passing valve 15 being arranged between the compressor 3 and the turbine 5 to enable the passage of fluid from the compressor 3 to the turbine 5, and the turbine by-passing valve 16 being arranged between the compressor 3 and the combustion chamber 7 to enable the passage of fluid from the compressor 3 to the combustion chamber 7.

Preferably, the turbine passing valve 15 is arranged in the compressor outlet duct 37. Additionally, according to a preferred embodiment, the gas turbine engine 1 further comprises a by-passing duct 12 connecting the compressor 3 with the combustion chamber 7 to conduct the compressed fluid toward the combustion chamber 7, and wherein the by-passing valve 16 is arranged in the by-passing duct 12.

Figure 9:
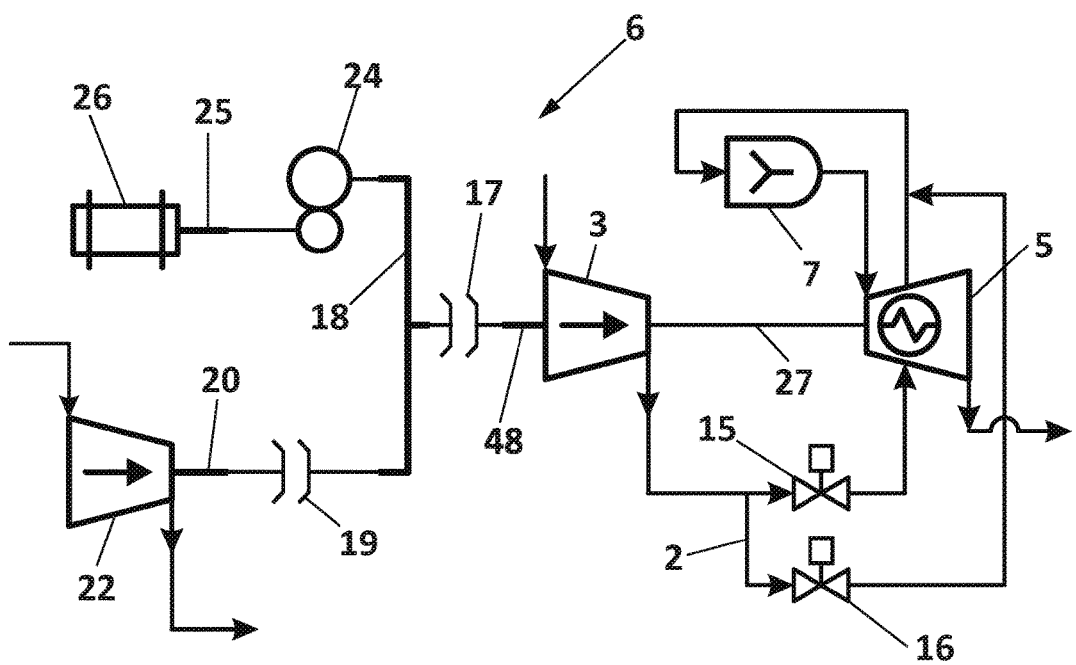
FIG. 9 shows a schematic block diagram of a gas turbine engine for producing energy, according to another preferred embodiment of the invention.

According to another aspect of the present invention, and as shown in FIG. 9, the invention further comprises an aircraft power system 6 comprising the gas turbine engine 1 as described, an electric power generator 26, a gearbox 24, and a first and a second shafts 18, 25, wherein the first shaft 18 is mounted between the gearbox 24 and the compressor 3, and the second shaft 25 between the gearbox 24 and the generator 26, such that when the first shaft 18 is driven by the compressor 3, the second shaft 25 is propelled to drive the gearbox 24 to obtain electric power for the aircraft by means of the generator 26.

According to a preferred embodiment, the aircraft power system 6 further comprises a load compressor 22, and a third shaft 20, wherein the third shaft 20 is mounted between the load compressor 22 and the compressor 3, such that when the third shaft 20 is driven by the compressor 3, pneumatic power is obtained by means of the load compressor 22.

According to another preferred embodiment, the aircraft power system 6, further comprises a common shaft 48 and a compressor clutch 17, the common shaft 48 connecting both the first and third shafts 18, 20 with the compressor 3, and the compressor clutch 17 arranged in the common shaft 48 for disconnecting the compressor 3.

Preferably, the power system 6, further comprises a load compressor clutch 19 arranged in the third shaft 20 for disconnecting the load compressor 22.

Finally, according to another aspect of the present invention, the invention further comprises an aircraft comprising the power system 6 as described.

With respect to existing gas turbine engines, the present invention offers the following advantages:

Weight saving, since there is no need to install different equipment, such as a heat exchanger downstream of the turbine.

Maintainability and integration improvement, since providing a gas turbine engine with an integrated heat exchanger-turbine simplifies the installation in the working environment.

Fuel savings, since the invention allows increasing the temperature of the fluid at the combustion chamber inlet.

Figure 3:
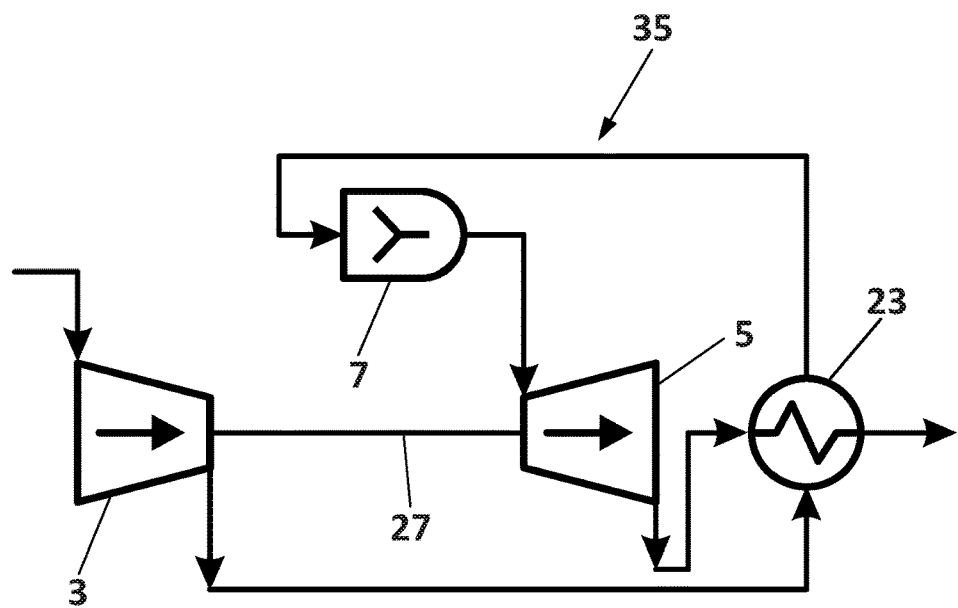
FIG. 3 shows a schematic block diagram of a conventional gas turbine engine including a heat exchanger to improve the engine efficiency.

Pressure losses reduction. In prior technical solutions with a heat exchanger downstream the turbine (FIG. 3), the fluid is taken from compressor outlet to the heat exchanger, and then come back to the combustion chamber inlet. This implies pressure losses. The invention allows reducing these pressure losses, since the heat exchange will be performed closer to both the compressor outlet and the combustion chamber inlet. Less pressure losses implies a higher cycle efficiency, thereby less fuel consumption.

Noise improvement, by avoiding the use of heat exchangers, which emitted a significant noise level. In particular, the same acoustic containment for the engine (auxiliary power unit) and the heat exchanger can be used.

Emissions reduction provided the invention includes a catalytic treatment over surfaces of the turbine section to reduce emissions.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A gas turbine engine for an aircraft comprising:
   a rotating shaft extending along a longitudinal axis and defining an axial direction, a radial direction, and a circumferential direction;
   a compressor coupled to the rotating shaft for increasing pressure and temperature of ambient air to obtain compressed air;
   a combustion chamber for increasing the temperature of the compressed air to obtain a heated fluid; and
   a turbine comprising an outer wall, an inner wall radially inward of the outer wall, at least one stator surrounding the inner wall, and at least one rotor surrounded by the outer wall;
   wherein the rotating shaft is disposed radially inward of the inner wall and the at least one rotor extends radially outward from the rotating shaft through the inner wall;
   wherein each of the at least one stator and each of the at least one rotor includes a plurality of blades, wherein circumferentially consecutive blades of the pluralities of blades are discrete blades spaced apart at the leading edges thereof, a fluid channel being formed radially outward of the inner wall between each two circumferentially consecutive blades of the pluralities of blades, and each blade of the pluralities of blades has two opposing surfaces;
   wherein the fluid channels of each of the at least one stator include a first group of fluid channels for conducting the compressed air and a second group of fluid channels for conducting the heated fluid, the first group of fluid channels circumferentially alternating with the second group of fluid channels;
   wherein the compressor is configured to discharge the compressed air to flow radially outward into the first group of fluid channels of a first stator of the at least one stator, and the combustion chamber is configured to discharge the heated fluid to flow axially into the second group of fluid channels of the first stator of the at least one stator, such that heat exchange can be performed between the compressed air and the heated fluid through the two opposing surfaces of at least one blade of the plurality of blades of the first stator of the at least one stator;
   wherein an inner surface of the outer wall and an outer surface of the inner wall define a duct for the passage of the heated fluid axially through the second fluid channels of the plurality of blades of the at least one stator to the plurality of blades of the at least one rotor;
   wherein the inner surface of the outer wall is arranged for directing the heated fluid axially through the at least one rotor;
   wherein an outer surface of the outer wall is arranged for directing the compressed air radially out of the first fluid channels of the at least one stator and axially towards the combustion chamber;
   wherein the at least one stator of the turbine comprises a second stator spaced apart from the first stator of the at least one stator by one of the at least one rotor;
   wherein the plurality of blades of the at least one rotor are arranged for directing the heated fluid from the second group of fluid channels of the first stator into the second group of fluid channels of the second stator before exiting the gas turbine engine;
   wherein the gas turbine engine further comprises at least one deflector radially outward of the outer wall with respect to the longitudinal axis and coaxially arranged with respect to both the first stator and the second stator;
   wherein the deflector is configured for directing the compressed air through each one of the first group of fluid channels of the first stator and the first group of fluid channels of the second stator before entering the combustion chamber; and
   wherein the deflector extends between the first stator and the second stator such that the compressed air is conducted from an output of the first group of fluid channels of the first stator to an input of the first group of fluid channels of the second stator.

2. The gas turbine engine for an aircraft, according to claim 1, wherein the compressor has an inlet and an outlet, and wherein the gas turbine engine further comprises:
   a compressor outlet duct for conducting the compressed air from the compressor outlet to the first group of fluid channels of the first stator; and
   a combustion chamber outlet duct for conducting the heated fluid from the combustion chamber into the second group of fluid channels of the first stator,
   wherein the compressor outlet duct and the combustion chamber outlet duct comprise a fluid directing means for respectively directing the compressed air from the compressor outlet duct towards the first group of fluid channels of the first stator and the heated fluid from the combustion outlet duct towards the second group of fluid channels of the first stator.

3. The gas turbine engine for an aircraft according to claim 2, wherein the fluid directing means of the compressor outlet duct and the combustion chamber outlet duct comprises a grid at respective outlet ports of the compressor outlet duct and the combustion chamber outlet duct for respectively directing the compressed air towards the first group of fluid channels of the first stator and the heat fluid towards the second group of fluid channels of the first stator.

4. The gas turbine engine for an aircraft according to claim 1, wherein the first stator further comprises a grid configured to receive the compressed air at the first group of fluid channels of the first stator and the heated fluid at the second group of fluid channels of the first stator.

5. The gas turbine engine for an aircraft according to claim 1, wherein the gas turbine engine consists of an auxiliary power unit.

6. An aircraft power system comprising the gas turbine engine according to claim 1, the system further comprising:
   an electric power generator;
   a gearbox; and
   a first shaft and a second shaft,
   wherein the first shaft is mounted between the gearbox and the compressor, and the second shaft is mounted between the gearbox and the generator, such that when the first shaft is driven by the compressor, the second shaft is propelled via the gearbox to drive the generator to obtain electric power for the aircraft from the generator.

7. The aircraft power system according to claim 6, further comprising a load compressor, and a third shaft, wherein the third shaft is mounted between the load compressor and the compressor, such that when the third shaft is driven by the compressor, pneumatic power is obtained by means of the load compressor.

8. The aircraft power system according to claim 7, further comprising a load compressor clutch arranged in the third shaft for disconnecting the load compressor.

9. An aircraft comprising the aircraft power system according to claim 6.

* * * * *